Patented Oct. 4, 1932

1,880,226

UNITED STATES PATENT OFFICE

DANIEL ZINNER, OF SOUTH MILWAUKEE, WISCONSIN, ASSIGNOR, BY MESNE ASSIGNMENTS, TO E. I. DU PONT DE NEMOURS & COMPANY, A CORPORATION OF DELAWARE

AZO DYESTUFF AND PROCESS OF MAKING THE SAME

No Drawing.   Application filed December 11, 1930. Serial No. 501,672.

This invention relates to azo dyestuffs and to a process of preparing the same and is a continuation in part of my U. S. application Serial No. 290,044, filed July 2, 1928.

In the above mentioned application, I have disclosed novel dyestuffs which are prepared by coupling a tetrazotized 4,4'-diamino-diphenylmethane compound which is substituted in the 2,2'-positions, to various pyrazolone components. The dyestuffs thus obtained are characterized by greenish-yellow to reddish-orange tints of great fastness to light and to milling.

I have now found that dyestuffs of greenish-yellow to orange and red shades, of equally good fastness to light and to milling may be obtained by the use of the unsubstituted 4,4'-diamino-diphenylmethane.

My invention therefore comprises novel dyestuffs having the following probable general formula:

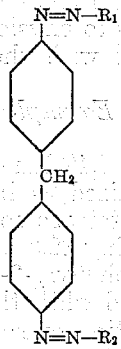

in which $R_1$ stands for a pyrazolone residue, and $R_2$ stands for the same or a different pyrazolone residue or for any other component, and in which the aryl nuclei are not substituted.

The diamino-diphenylmethane may be prepared by methods analogous to those described in my copending application Serial No. 290,044 applied to the substituted diamino-diphenylmethanes. More particularly, I prefer to prepare them from aniline and formaldehyde in acid solution by the use of ½ mole of formaldehyde to 1 mole of aniline.

As stated, the groups $R_1$ and $R_2$ may be the same or different 3-substituted-5-pyrazolone residues. The hydrogens on the aromatic ring of the pyrazolones may be substituted by other groups, for example by alkyl, halogen, alkoxy, sulfonic acid and the like. In order to give the dyestuff proper solubility in the dye bath, the aryl nucleus of the pyrazolone residue should contain at least one solubility-imparting group, such as an $SO_3H$ group, or a $COOH$ group.

Without limiting my invention to any particular procedure, the following examples in which parts by weight are given will serve to illustrate my method in its preferred form.

Example 1

19.8 parts of 4,4'-diamino-diphenyl-methane base are tetrazotized in the usual manner with 58 parts of hydrochloric acid of 20° Bé and 13.8 parts of sodium nitrite in 200 cc. of water. The resulting tetrazo solution is run into a cooled solution containing 66 parts of 1-(2',5'-dichloro-4'-sulfo-phenyl)-3-methyl-5-pyrazolone and rendered alkaline with sodium carbonate. (Sodium acetate may be substituted for neutralizing the acid in the tetrazo solution).

After stirring for a short time, common salt is added until about a 20% salt solution results, and the mixture is then heated to about 80° C. The solution is cooled somewhat and the separated dyestuff is filtered off, washed with a little water and dried. The product after drying is a yellow powder which dyes wool and silk in an acid or neutral bath greenish yellow shades, remarkably fast to light and to milling.

The product in its free acid form has most probably the following formula:

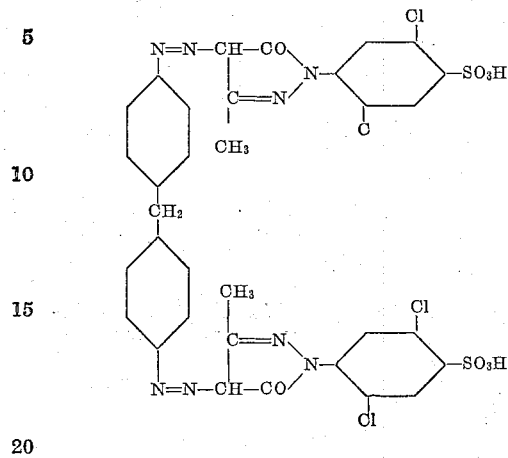

Example 2

19.8 parts of 4,4'-diamino-diphenylmethane base are tetrazotized as in Example 1, run into a cooled solution containing 58 parts of 1-(2'-chloro-5'-sulfo-phenyl)-3-methyl-5-pyrazolone and rendered alkaline with sodium carbonate. The dyestuff is isolated as in Example 1. The product after drying is a yellow powder which dyes wool and silk in an acid or neutral bath greenish yellow shades remarkably fast to light and to milling.

Example 3

19.8 parts of 4,4'-diamino-diphenylmethane base are tetrazotized as in Example 1, run into a cooled solution containing 52 parts of 1-(4'-sulfo-phenyl)-3-methyl-5-pyrazolone and rendered slightly alkaline with sodium carbonate.

The dyestuff is isolated as in Example 1. The product after drying is a yellow powder which dyes wool and silk in an acid or neutral bath yellow shades remarkably fast to light and to milling.

Other pyrazolones may similarly be used as coupling components; for instance, any of the pyrazolones mentioned in the table below. Again, if for instance unsulfonated phenylmethyl-pyrazolone is used, the resulting dyestuff is insoluble in water and may be used as a pigment.

If desired, my tetrazo-diphenyl-methane compound may be coupled first to any other component for instance, naphthol-sulfonic acid or naphthylamine-sulfonic acid, etc., and then coupled to a pyrazolone component. The shade in such a case depends on the other component. In the case of naphthols, it is generally orange to red. The following additional examples will serve to illustrate the process of preparing unsymmetrical dyestuffs of the above type.

Example 4

19.8 parts of 4,4'-diamino-diphenylmethane are tetrazotized in the usual manner with 13.8 parts of sodium nitrite and 58 parts of hydrochloric acid (20° Bé) at a temperature of 0 to 5° C. The tetrazo solution is neutralized by the addition of sodium carbonate, sodium bicarbonate or sodium acetate. To this neutralized tetrazo solution is added an alkaline solution containing 32.3 parts of 1-(2',5'-dichloro-4'-sulfo-phenyl)-3-methyl-5-pyrazolone. While the coupling is progressing, there is run into the coupling mass a solution of soda ash until the mass becomes alkaline. To this intermediate product is then added an alkaline solution containing 22.4 parts of 1-naphthol-4-sulfo-acid. The color changes from a yellow to orange shade and the coupling is finished in a few hours. The mass is salted to 20° Bé with common salt and heated at 80° C. After cooling somewhat, the dyestuff is filtered off and dried. It is an orange colored product which dyes silk or wool from an acid or neutral bath bright orange shades remarkably fast to light and to milling.

Example 5

The procedure in Example 4 can be reversed. That is, to the neutralized tetrazo solution there is first added an alkaline solution containing 22.4 parts of 1-naphthol-4-sulfo acid. To this coupling mass, which is completely reacted within a short time, 32.3 parts of 1-(2'-5'-dichloro-4'-sulfo-phenyl)-3-methyl-5-pyrazolone is then added and the product isolated as in Example 4. It is identical as to physical appearance and dyeing qualities with the product of Example 4.

Example 6

19.8 parts of 4,4'-diamino-diphenylmethane are tetrazotized as in Example 4. To the neutralized tetrazo solution an alkaline solution containing 32.3 parts of 1-(2',5'-dichloro-4'-sulfo-phenyl)-3-methyl-5-pyrazolone is added and while the coupling is progressing, a solution of sodium carbonate is run into the coupling mass until the mass becomes alkaline. An alkaline solution containing 28.7 parts of 1-(2'-chloro-5'-sulfo-phenyl)-3-methyl-5-pyrazolone is then added to this intermediate coupling product. The coupling is finished in a few hours and is isolated as in Example 4. It is a yellow colored product which dyes silk or wool from an acid or neutral bath yellow shades remarkably fast to light and to milling.

The following table illustrates various other novel dyestuffs producible by my invention.

| Tetrazo component: 4, 4'-diamino-diphenylmethane | | Shade |
|---|---|---|
| Coupling components | | |
| R₁ | R₂ | |
| 1-(2',5'-dichloro-4'-sulfo-phenyl)-3-methyl-5-pyrazolone. | 1-(2',4'-dichloro-5'-sulfo-phenyl)-3-methyl-5-pyrazolone | Yellow. |
| Do | 1-(2'-3'-dichloro-6'-sulfo-phenyl)-3-methyl-5-pyrazolone | Do. |
| Do | 1-(2',5'-dichloro-3'-sulfo-phenyl)-3-methyl-5-pyrazolone | Do. |
| Do | 1-(4'-sulfo-phenyl)-3-methyl-5-pyrazolone | Do. |
| Do | 1-phenyl-3-methyl-5-pyrazolone | Do. |
| Do | 1-(4'-methyl-6'-sulfo-phenyl)-3-methyl-5-pyrazolone | Do. |
| Do | 1-(2'-methoxy-4'-sulfo-phenyl)-3-methyl-5-pyrazolone | Do. |
| Do | Methyl ketole, or its sulfonic acid | Do. |
| Do | Aceto-acet-anilide | Do. |
| Do | Phenol or cresol, then treat the dye with toluol-sulfo-chloride | Do. |
| Do | Mono-acetyl-meta-phenylene-diamine | Do. |
| Do | Mono-acetyl-meta-toluylene-diamine | Do. |
| Do | 1-(3' or 4'-carboxy-phenyl)-3-methyl-5-pyrazolone | Do |
| Do | Beta-naphthol | Yellowish-orange. |
| Do | Beta-naphthol-sulfonic acids | Orange. |
| Do | Alpha-naphthol-sulfonic acids | Do. |
| Do | 2-amino-5-naphthol-7-sulfonic acid | Do. |
| Do | 1-amino-8-naphthol-3,6-disulfonic acid or its N-substitution derivatives (such as benzoyl, acetyl or toluene-sulfonyl) | Red. |
| Do | 1-amino-8-naphthol-4-sulfonic acid or 1-amino-8-naphthol-2,4-disulfonic acid | Do. |
| Do | 2-amino-8-naphthol-6-sulfonic acid or its N-substitution derivatives (such as benzoyl, acetyl, or toluene-sulfonyl) | Reddish-brown. |

It will be understood, of course, that the above table does not exhaust the field of applicability of my invention, but is submitted merely for illustrative purposes.

Instead of 1-(2',5'-dichloro-4'-sulfo-phenyl)-3-methyl-5-pyrazolone in said table, any other pyrazolone may be used as the $R_1$ component. Various other combinations are possible within the scope of my invention, providing that one of the components is a pyrazolone derivative. Instead of the 3-methyl-pyrazolones mentioned, the corresponding 3-carboxy-pyrazolones may be used.

It is to be understood in the following claims that the order of coupling may be reversed. Thus the coupling with the $R_1$ and $R_2$ components may be interchanged in each case within the scope of the claims.

In the claims below, it should be understood that where new products, dyestuffs, or articles of manufacture are claimed, I mean to include those bodies not only in substance but also in whatever state they exist when applied to material dyed, printed, or pigmented therewith.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing azo dyestuffs which comprises coupling a pyrazolone body to a compound having the following probable general formula:

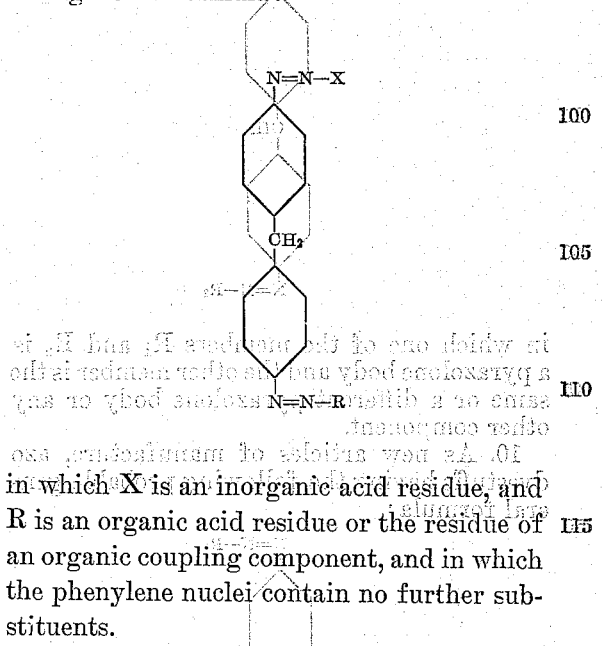

in which X is an inorganic acid residue, and R is an organic acid residue or the residue of an organic coupling component, and in which the phenylene nuclei contain no further substituents.

2. The process of preparing azo dyestuffs which comprises coupling a pyrazolone body to a 4,4'-tetrazo-diphenylmethane compound having no further substituents in the phenylene nuclei and in which at least one of the diazo groups is free to couple to organic components.

3. The process of preparing azo dyestuffs which comprises coupling tetrazotized 4,4'- diamino-diphenylmethane to a pyrazolone body and to a second coupling component.

4. The process of preparing azo dyestuffs which comprises coupling tetrazotized 4,4'-diamino-diphenylmethane to a pyrazolone body and to a naphthol body.

5. The process of preparing azo dyestuffs which comprises coupling tetrazotized 4,4'-diamino-diphenylmethane to two different pyrazolone bodies.

6. The process of preparing azo dyestuffs which comprises coupling tetrazotized 4,4'-diamino-diphenylmethane to substantially two moles of a pyrazolone body.

7. The process of preparing azo dyestuffs which comprises coupling tetrazotized 4,4'-diamino-diphenylmethane to two different pyrazolone bodies, one of which is 1-(2',5'-dichloro-4'-sulfo-phenyl)-3-methyl-5-pyrazolone.

8. The process of preparing azo dyestuffs which comprises coupling tetrazotized 4,4'-diamino-diphenylmethane to substantially two moles of 1-(2',5'-dichloro-4'-sulfo-phenyl)-3-methyl-5-pyrazolone.

9. As new articles of manufacture, azo dyestuffs of the following probable general formula:

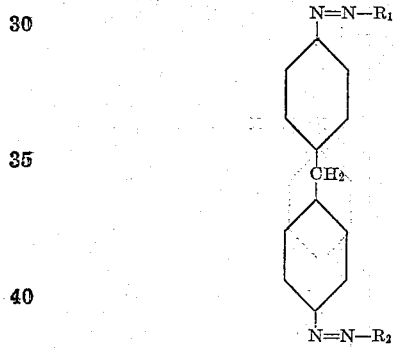

in which one of the members $R_1$ and $R_2$ is a pyrazolone body and the other member is the same or a different pyrazolone body or any other component.

10. As new articles of manufacture, azo dyestuffs having the following probable general formula:

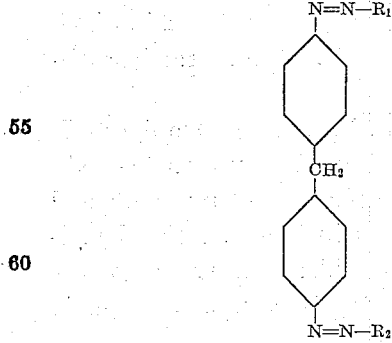

in which $R_1$ and $R_2$ are the same or different pyrazolone bodies.

11. As new articles of manufacture, azo dyestuffs of the following probable general formula:

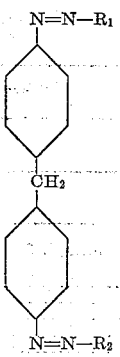

in which one of the members, $R_1$ and $R_2$, is 1-(2',5'-dichloro-4'-sulfo-phenyl)-3-methyl-5-pyrazolone and the other member is the same or a different pyrazolone body or any other component.

12. As new articles of manufacture, azo dyestuffs having the following probable general formula:

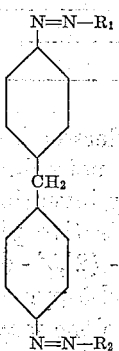

in which $R_1$ is 1-(2',5'-dichloro-4'-sulfo-phenyl)-3-methyl-5-pyrazolone, and $R_2$ is the same or a different pyrazolone body.

13. As a new article of manufacture, a dyestuff having, in the form of its free acid, the following probable formula:

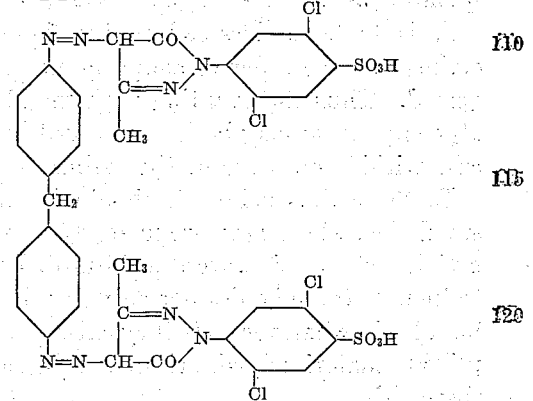

said dyestuff dyeing wool and silk from an acid or neutral bath in yellow shades fast to light and to milling.

In testimony whereof I have hereunto subscribed my name at Carrollville, Milwaukee County, Wisconsin.

DANIEL ZINNER.